Figure 1:
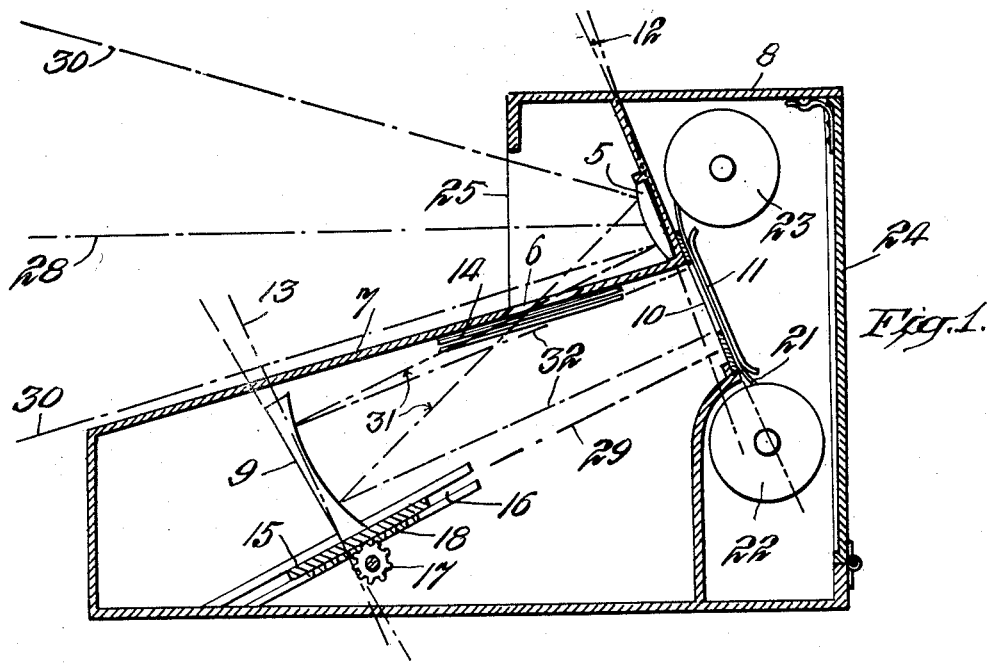

April 5, 1960 A. BELOK 2,931,280
CAMERA
Filed July 14, 1955

INVENTOR.
ALFRED BELOK
BY Philip S. McQuan
ATTORNEY

United States Patent Office 2,931,280
Patented Apr. 5, 1960

2,931,280

CAMERA

Alfred Belok, Rockaway Park, N.Y.

Application July 14, 1955, Serial No. 522,085

1 Claim. (Cl. 95—11)

The invention herein disclosed relates to photographic cameras and the general objects of the invention are to provide a simple, inexpensive, lightweight, small size construction devoid of lenses or other costly parts and adapted particularly for taking pictures in color.

Other important objects of the invention are to provide a camera having advantages such as mentioned which will be easy to understand and operate, which will utilize a maximum of light rays and which may be quickly and easily accurately focused to get best results.

Other desirable objects attained by the invention and the novel features of construction, combination and relation of parts through which the purposes of the invention are attained are set forth and will appear in the course of the following specification.

The drawing accompanying and forming part of the specification illustrates a present embodiment of the invention but structure may be modified and changed as regards this illustration, all within the true intent and scope of the invention as hereinafter defined and claimed.

Figure 2:
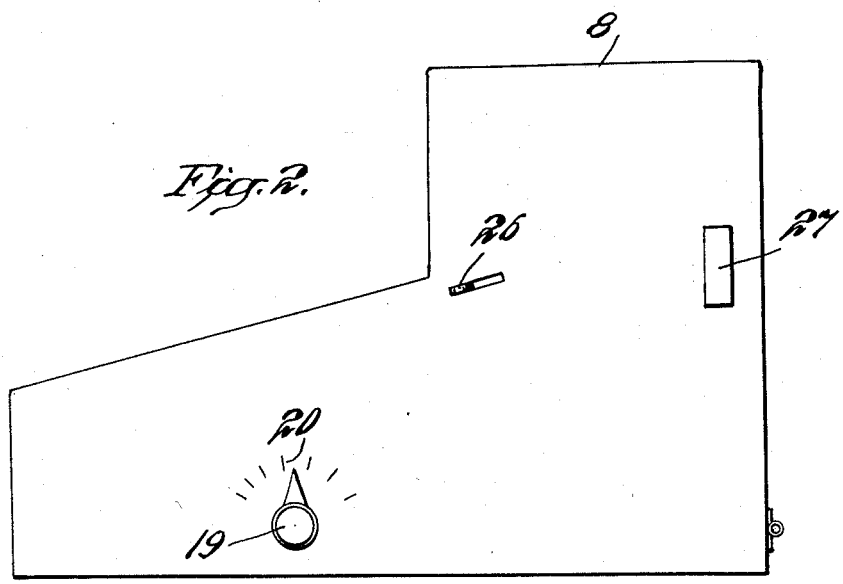

Fig. 1 in the drawing is a longitudinal sectional view of one of the cameras with broken lines starting at the left indicating light rays impinging on a convex or receptive mirror and directed therefrom through a light aperture onto a concave mirror within the camera, reflecting the collected image in substantially parallel rays onto the light sensitive film at the exposure aperture;

Fig. 2 is a side elevation of the same camera.

As shown in Fig. 1, the invention resides in the combination of a convex mirror 5 inclined downward and forward toward the view to be taken and arranged to project the collected rays through a light aperture 6 in the upper, downwardly inclined wall 7 of the camera case 8 onto an upwardly inclined concave mirror 9 in the lower front portion of the camera facing the exposure opening 10 of the forwardly inclined film gate or support 11.

The diverging convex mirror 5 is shown located directly above the film gate and inclined approximately 5° to the right of the plane of the exposure film represented by line 12, and the concave converging mirror 9 is shown inclined approximately 5° to the left of a plane represented by line 13 parallel with the plane of the film support.

The light opening 6 in the inclined top wall 7 is located below and close to the convex mirror, where the rays of the image are converged to the smallest diameter, and this opening is controlled by a suitable shutter which may be of any conventional or special design, as indicated at 14.

The light aperture is shown large enough to pass all or substantially all light rays reflected by the convex mirror, and may, if desired, be equipped with a suitable iris diaphragm or the like.

The concave mirror is shown mounted on a slidable carrier 15 operating in ways 16 substantially at a right angle to the film plane and shifted by pinion 17 engaging rack 18 on the carrier, the pinion being turned by an external knob 19 turning over a scale 20, possibly running from zero to infinity.

The film is designated 21 extending over the planar support between supply and takeup spools 22, 23 which may have any suitable operating means and which may be accessible through the medium of a hinged door 24 in the back wall of the casing.

A light shielding enclosure is indicated at 25 extending over the light aperture 6 and the top of the convex mirror 5.

Suitable means are provided for actuating the shutter such as the lever indicated at 26, Fig. 2, and an appropriate view finder may be mounted on the case in the line of exposure, as indicated at 27.

To take a picture parallel to the geographic level as on the broken line 28, Fig. 1, the parts are inclined substantially as indicated, with the line 29 representing the plane of adjustment of the concave mirror substantially at a right angle to the film plane and approximately 28° from the horizontal, as represented by the picture line 28.

The convex mirror serves to reflect a scene received on its surface. This mirror is located beyond the focal point of the concave mirror which thereby receives a reversed image of the scene and reflects it in parallel rays to the film.

The rays of the image are converged to the smallest beam approximately at or within the aperture 6, making this the most practical location for the shutter and iris opening.

In Fig. 1 light rays from the scene are indicated at 30 converging on the convex mirror which transmits the collected image in reversed relation, as indicated by lines 31 onto the concave mirror which transmits the reflected image in substantially parallel rays 32 directly onto the film.

This combination and relation results in utilization of maximum light and maximum size view. There is no restriction of light by pinhole apertures or the like and fast or slow film may be used with appropriate shutter timing.

Because of the full light utilization the camera is particularly suited for color film.

As a practical example, for a 17 x 22 mm. picture size frame a convex mirror having a focal length of 76.2 mm. and a concave mirror having a focal length of 50.8 mm. have been used with an iris opening 9.5 x 9.5 mm.

This combination enables a small size, lightweight, inexpensive camera structure.

Pictures of larger dimensions may be taken on film using combinations of convex-concave mirrors of proportionately greater focal length.

It will be apparent from the disclosure that the rays of a scene are collected, converged upon the surface of the fixed convex mirror and by reflection are further converged to the narrowest point these rays can form, at or near the principal axis of the convex mirror.

The adjustable concave mirror is placed so that its principal axis coincides with that of the convex mirror.

When photographing objects at infinity the distance between the focal points along the coincident principal axes of the convex and concave mirrors must be at a minimum. As the distance between the object and the convex mirror decreases, the distance between the focal points of the two mirrors must be increased to maintain a sharp image at the film plane.

What is claimed is:

Camera comprising a camera case having a downwardly and forwardly inclined top wall provided with a shutter controlled light aperture, a downwardly and forwardly inclined convex mirror above said top wall to reflect light rays through said light aperture, an upwardly inclined concave reflecting mirror below said top wall within the camera case below said aperture and in line with the convex mirror and a film support in the line of reflection from said concave mirror, said film support being arranged on a downwardly and forwardly inclined plane, the convex mirror being inclined approximately 5° in one direction with respect to said plane and the concave mirror being inclined approximately 5° in the opposite direction with respect to said plane.

References Cited in the file of this patent

UNITED STATES PATENTS

| | | |
|---|---|---|
| 404,390 | Dutton | June 4, 1889 |
| 2,081,299 | Hill | May 25, 1937 |
| 2,531,783 | Mosca | Nov. 28, 1950 |
| 2,604,832 | Barcus | July 29, 1952 |

FOREIGN PATENTS

| | | |
|---|---|---|
| 3,058 | Great Britain | of 1903 |
| 1,068,136 | France | Feb. 3, 1954 |